US006491144B2

(12) United States Patent
Ueda et al.

(10) Patent No.: US 6,491,144 B2
(45) Date of Patent: Dec. 10, 2002

(54) PISTON ASSEMBLY FOR A DISC BRAKE

(75) Inventors: Toshiyuki Ueda, Izumi (JP); Rikimasa Ohishi, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/082,336

(22) Filed: Feb. 26, 2002

(65) Prior Publication Data

US 2002/0079175 A1 Jun. 27, 2002

Related U.S. Application Data

(62) Division of application No. 09/607,969, filed on Jun. 30, 2000.

(51) Int. Cl.[7] .................................................. F16F 9/06
(52) U.S. Cl. ...................................................... 188/269
(58) Field of Search ............................ 188/264 G, 72.4, 188/72.5, 71.6, 71.1, 370

(56) References Cited

U.S. PATENT DOCUMENTS 3,783,984 A 1/1974 Knapp et al.
4,496,033 A 1/1985 Hall et al.
4,572,334 A 2/1986 Villata
4,581,985 A 4/1986 Villata
4,798,270 A * 1/1989 Schneider et al. ...... 188/264 G
5,031,511 A 7/1991 Villata
5,613,577 A * 3/1997 Collin ....................... 188/72.4
6,146,727 A 11/2000 Dannels
6,347,689 B1 * 2/2002 Ohishi ....................... 188/72.4

FOREIGN PATENT DOCUMENTS

DE 39 06 827 A1 9/1990
JP 63-59228 U 4/1988
JP 63-157536 U 10/1988
JP 1-124437 U 8/1989
JP 2-120536 A * 5/1990 ................ 188/72.4
JP 2546624 Y2 5/1997
JP 9-203425 A 8/1997

* cited by examiner

*Primary Examiner*—Jack Lavinder
*Assistant Examiner*—Mariano Sy
(74) *Attorney, Agent, or Firm*—Shinjyu Global IP Counselors, LLP.

(57) ABSTRACT

A piston assembly is provided for a disc brake assembly to reduce the heat transferred to the hydraulic fluid of the disc brake assembly during braking. The piston assembly preferably includes a piston and a heat insulator designed to be movably coupled to a caliper housing to move a friction member between a release position and a braking position The piston has an internal recess to partially receive the heat insulator. The heat insulator is disposed between the piston and the friction member to reduce heat transfer from the friction member to the piston. Specifically, the piston and the heat insulator are configured to use air spaces to reduce heat transfer from the friction member to the piston.

20 Claims, 13 Drawing Sheets

PISTON ASSEMBLY FOR A DISC BRAKE

CROSS-REFERENCE TO RELATED APPLICATIONS

This application is a divisional application of U.S. patent application Ser. No. 09/607,969 filed on Jun. 30, 2000, pending. The entire disclosure of U.S. patent application Ser. No. 09/607,969 is hereby incorporated herein by reference.

BACKGROUND OF THE INVENTION

1. Field of the Invention

This invention generally relates to a heat insulator for a disc brake assembly. More specifically, the present invention relates to a heat insulator disposed between a piston and a friction member that reduces the heat transferred from the friction member to the hydraulic fluid of the disc brake assembly.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc braking systems, i.e., disc brake systems that have more braking power.

Conventionally, a disc brake is composed of a caliper housing with one or more pistons and a pair of brake pads with one or both of the brake pads being movably mounted to the caliper housing. The brake pads are pressed against a disc or rotor that is fixed to the wheel to halt the rotation of the disc and thus the wheel. The brake pads are moved toward the disc either hydraulically or mechanically such as by a cam mechanism. The hydraulic disc brake systems typically provide a high level of consistency in all types of weather and riding conditions. However, one problem with hydraulically actuated disc brakes is that the hydraulic or actuating fluid can become overheated such that vapor-lock occurs. In other words, the heat generated by braking results in the hydraulic fluid increasing in volume so as to cause the brake pads to engage the brake disc even when the brake lever is in the release position. When vapor-lock occurs, the bicycle wheels can lock up and throw the rider off of the bicycle.

In the prior art disc brake systems, several methods have been utilized to avoid vapor-lock. For example, the caliper housing can be made larger to absorb more heat. Another method has been to make a larger brake disc with a wider surface area. Also, vapor-lock can be suppressed by utilizing high quality hydraulic fluid. Yet another (method to avoid vapor-lock has been to use brake or friction pads which do not transfer the heat to the brake housing as readily as conventional friction pads. Still another method to avoid vapor-lock is to utilize a heat insulator between the piston and the friction pads. These prior art methods of avoiding vapor-lock have many problems. One particular problem is that some of these solutions often are expensive to manufacture. Also, some of these prior art solutions are not completely effective.

In view of the above, there exists a need for a heat insulator for a disc brake assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a heat insulator that dissipates heat transferred from a friction member to the actuating fluid of a disc brake assembly.

Another object of the present invention is to provide a heat insulator that is versatile and can be used with existing disc brake assemblies to dissipate heat transferred to the actuating fluid.

Still another object of the present invention is to provide a heat insulator that is relatively simple and inexpensive to manufacture.

The foregoing objects can basically be achieved by providing a disc brake assembly with a heat insulator. The disc brake assembly includes a caliper housing, a first and a second friction member coupled to the caliper housing, a piston and the heat insulator. The first and second friction members form a rotor receiving slot between the first and second friction members. At least the first friction member is movably coupled to the caliper housing. The piston is movably coupled to the caliper housing to move the first friction member between a release position and a braking position. The piston has an internal recess. The heat insulator is disposed between the piston and the first friction member. The heat insulator has a first end with a first end surface received in the recess of the piston, a second end with a second end surface spaced from the first end surface and a side wall extending between the first and second end surfaces. The second end is partially received in the recess of the piston and the side wall has a protrusion extending therefrom to space the heat insulator from the piston.

The foregoing objects can also basically be achieved by providing a disc brake assembly with a modified heat insulator. The disc brake assembly includes a caliper housing, a first and a second friction member coupled to the caliper housing, a piston and the heat insulator. The first and second friction members form a rotor receiving slot between the first and second friction members. At least the first friction member is movably coupled to the caliper housing. The piston is movably coupled to the caliper housing to move the first friction member between a release position and a braking position. The piston has an internal recess. The heat insulator is disposed between the piston and the first friction member. The heat insulator has a first end with a first end surface received in the recess of the piston, a second end with a second end surface spaced from the first end surface and a side wall extending between the first and second end surfaces. The second end is partially received in the recess of the piston and the second end surface has a groove formed therein.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
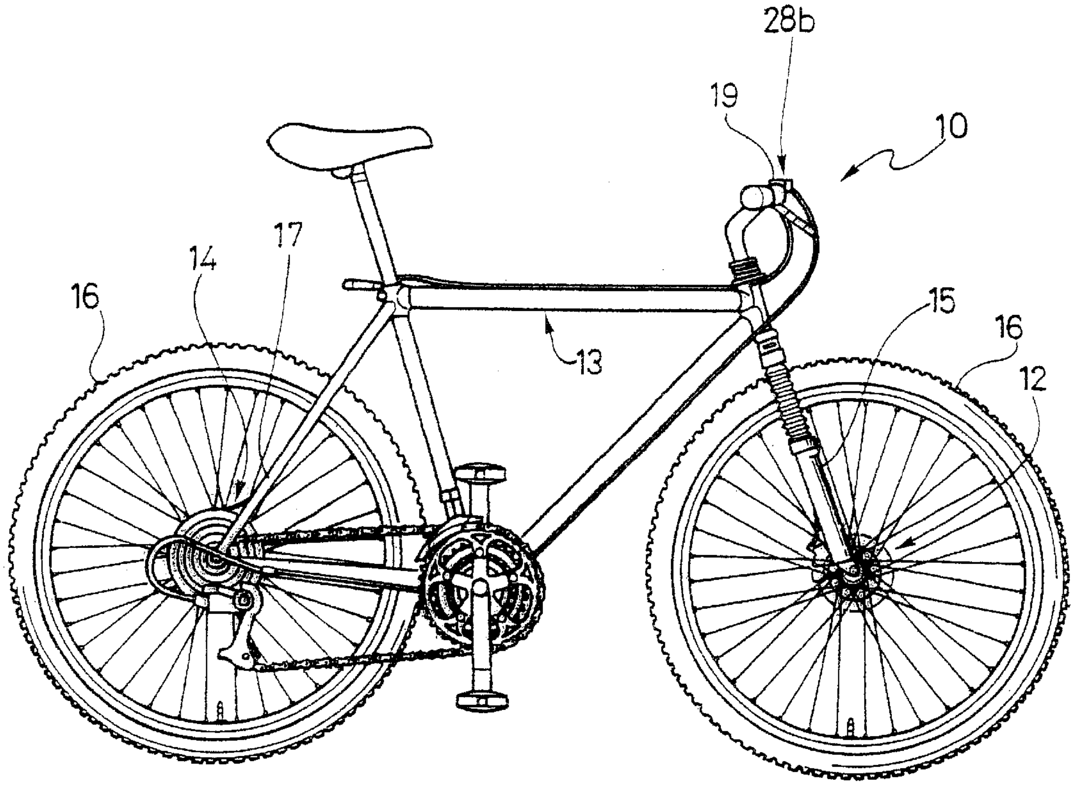
FIG. 1 is a side elevational view of a bicycle with a front disc brake assembly and a rear disc brake assembly in accordance with an embodiment of the present invention.
Figure 2:
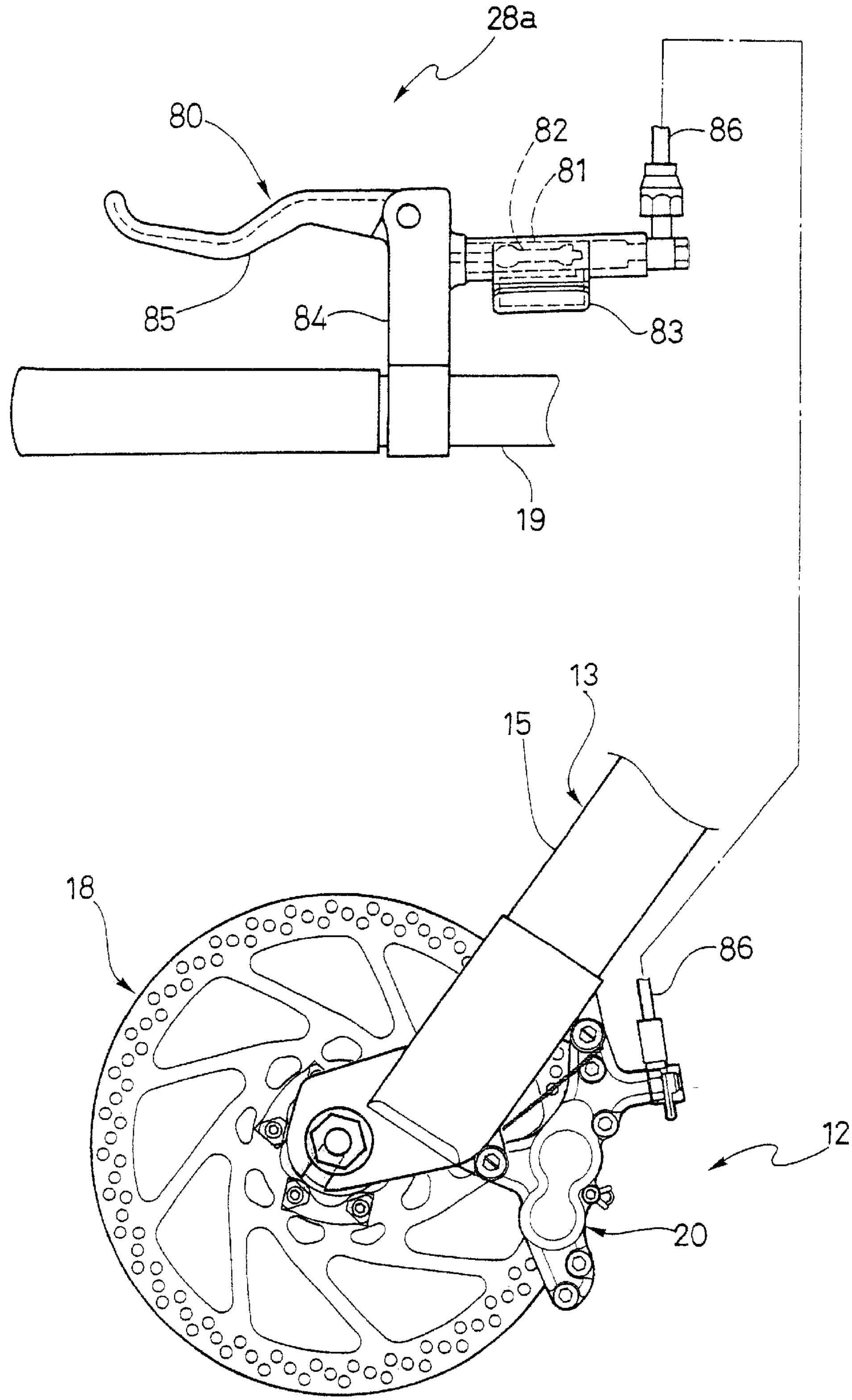
FIG. 2 is a side elevational view of the front disc brake assembly coupled to a front fork and a front disc brake operating mechanism of the bicycle illustrated in FIG. 1.
Figure 3:
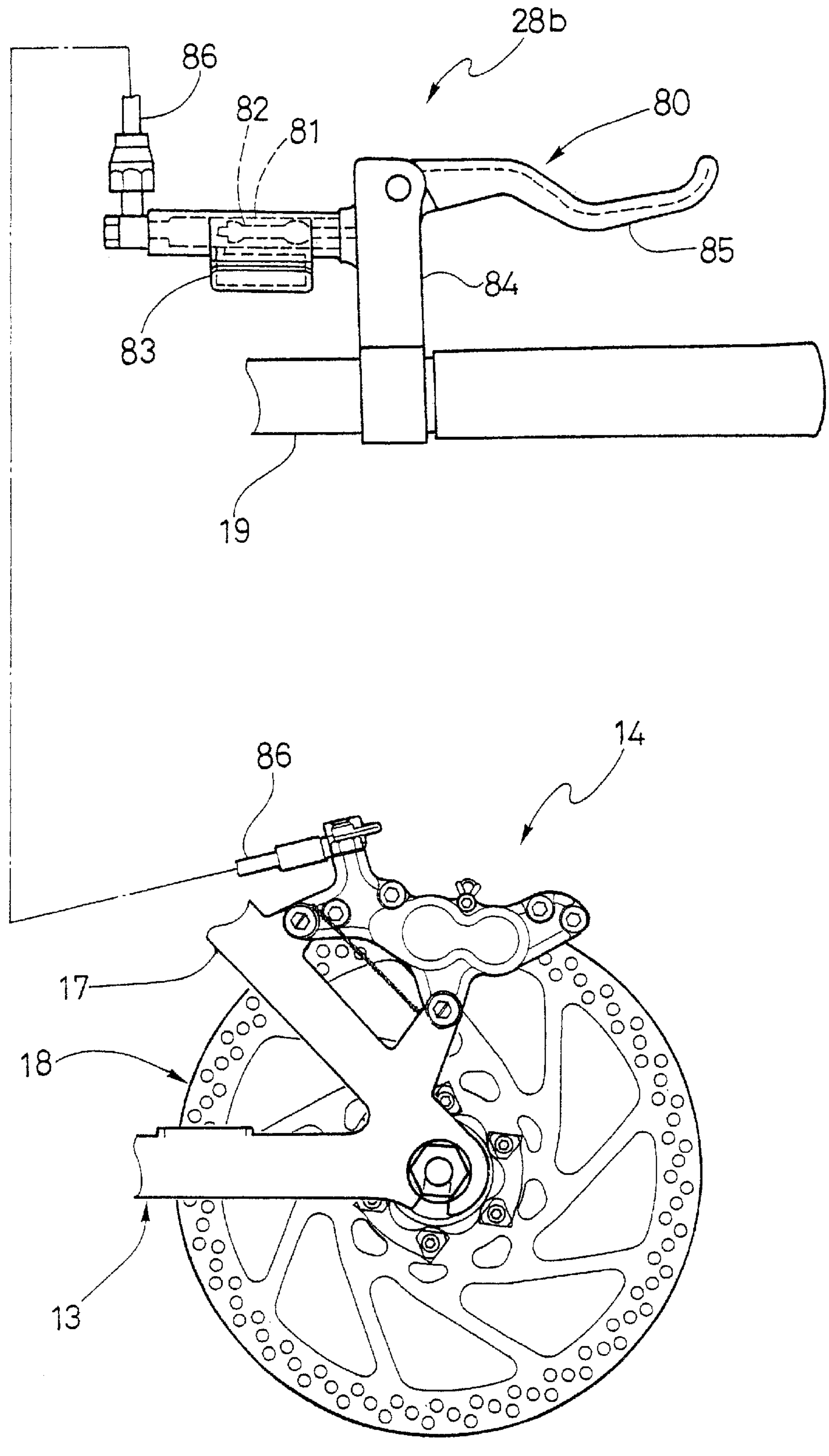
FIG. 3 is a side elevational view of the rear disc brake assembly coupled to a rear fork and a rear disc brake operating mechanism of the bicycle illustrated in FIG. 1.
Figure 4:
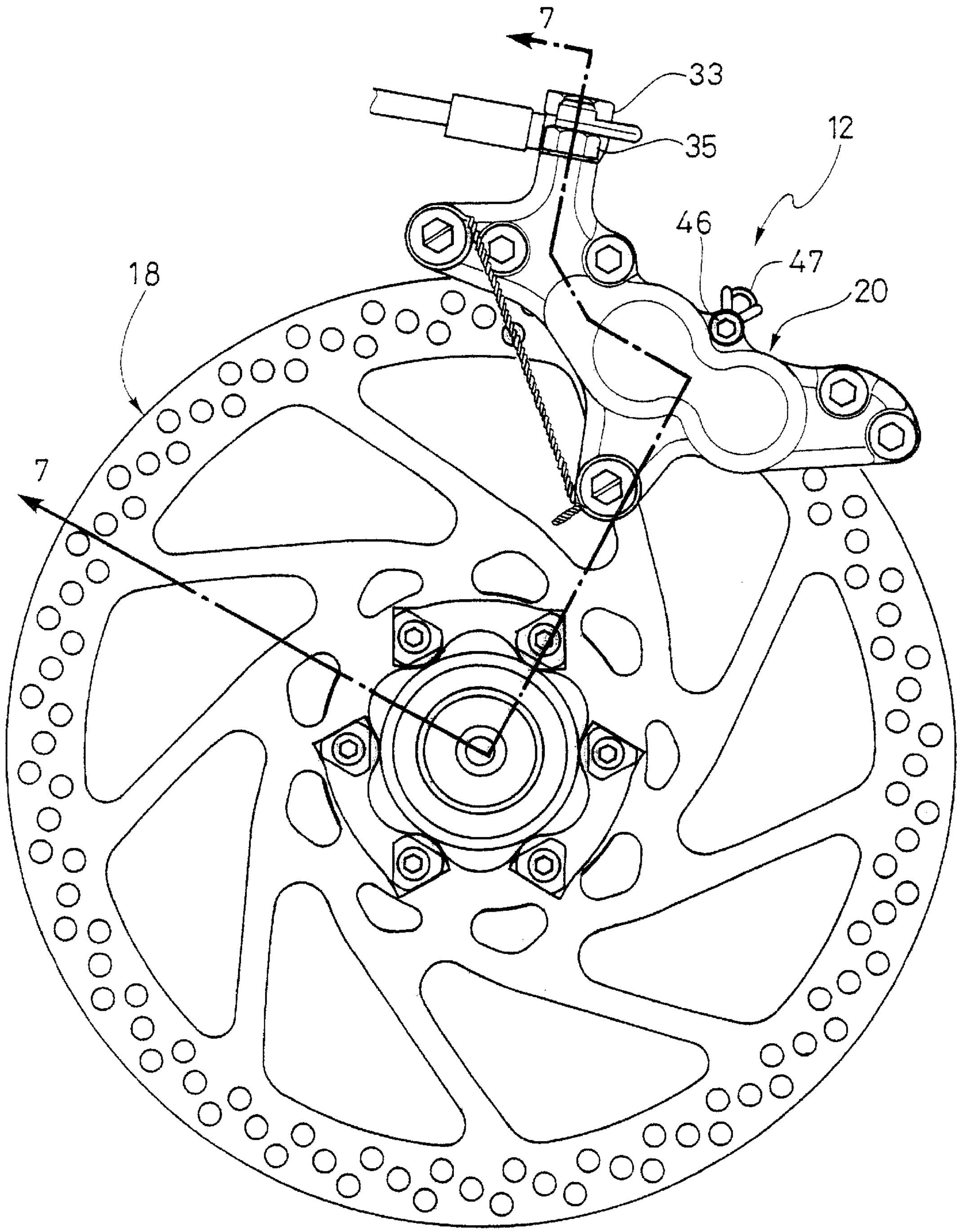
FIG. 4 is an enlarged, side elevational view of the front disc brake assembly illustrated in FIG. 2, with the bicycle frame removed for purposes of illustration.
Figure 5:
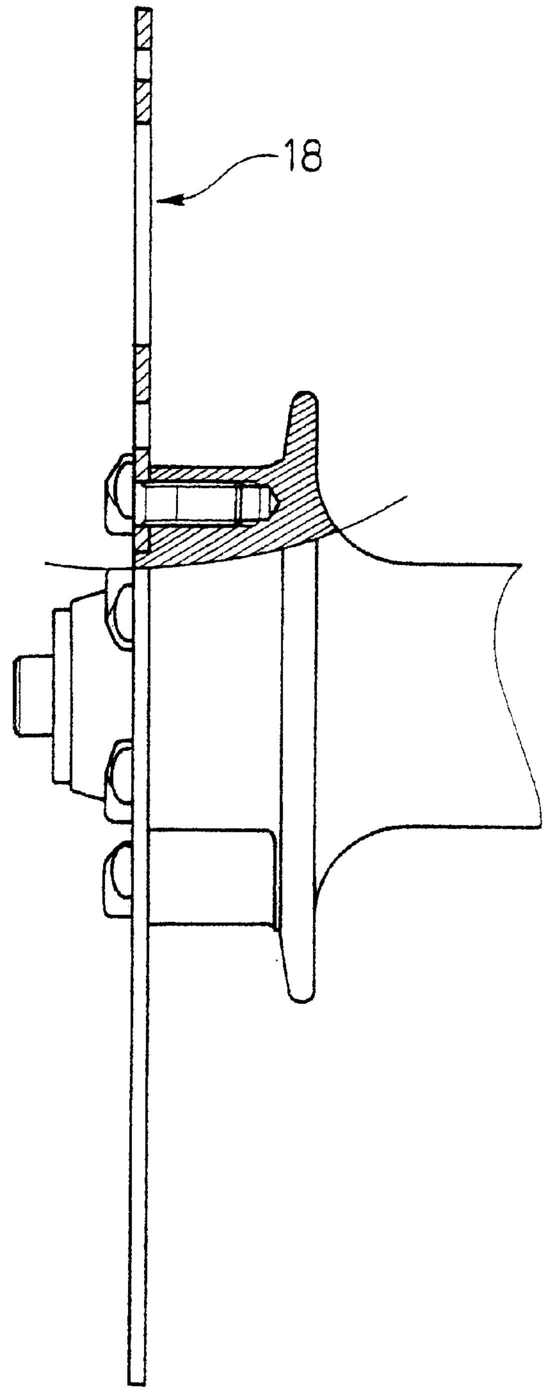
FIG. 5 is a partial cross-sectional view of a bicycle hub and disc brake rotor of one of the wheels of the bicycle illustrated in FIG. 1.
Figure 6:
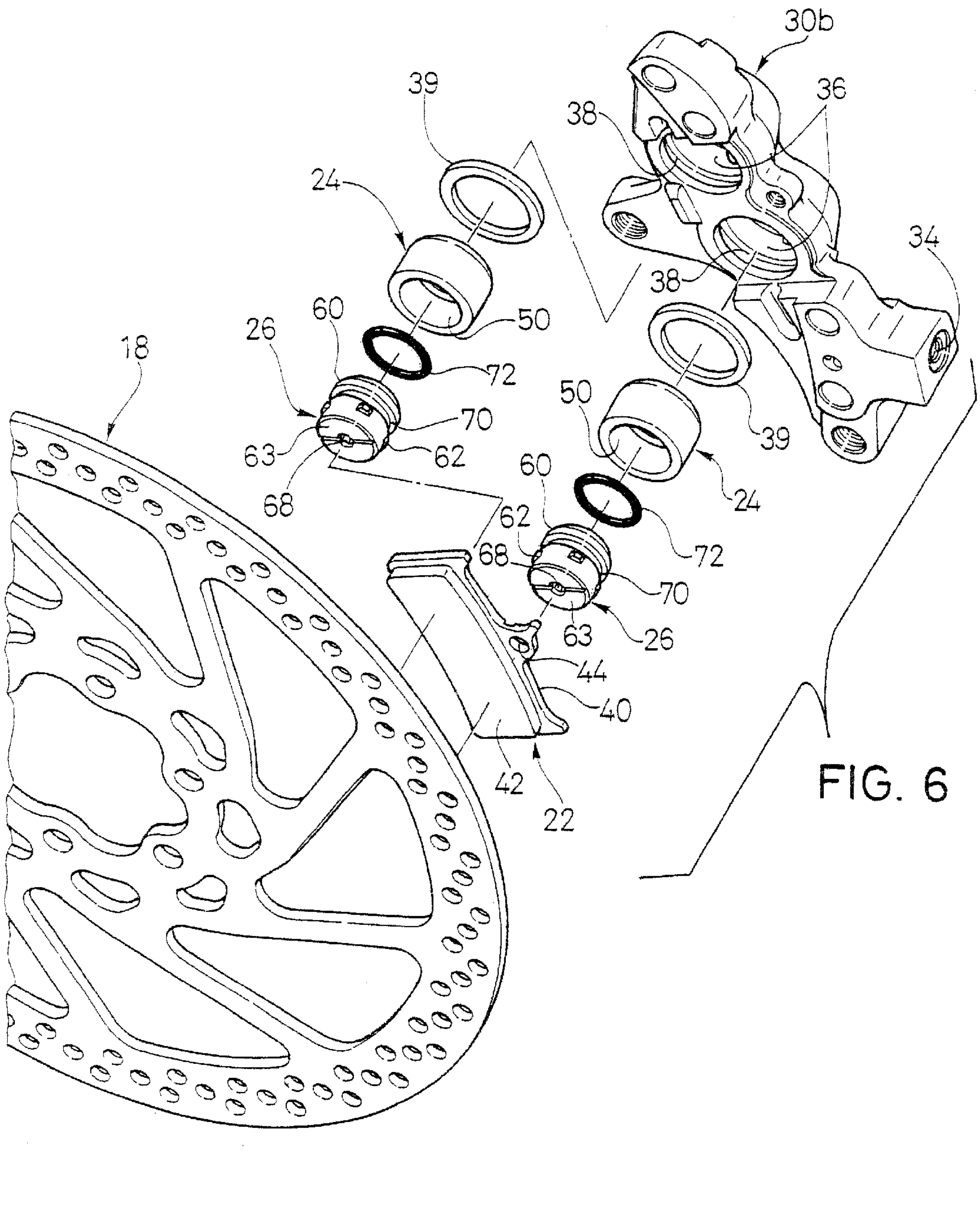
FIG. 6 is a partial exploded view of the front disc brake assembly illustrated in FIGS. 2 and 4.
Figure 7:
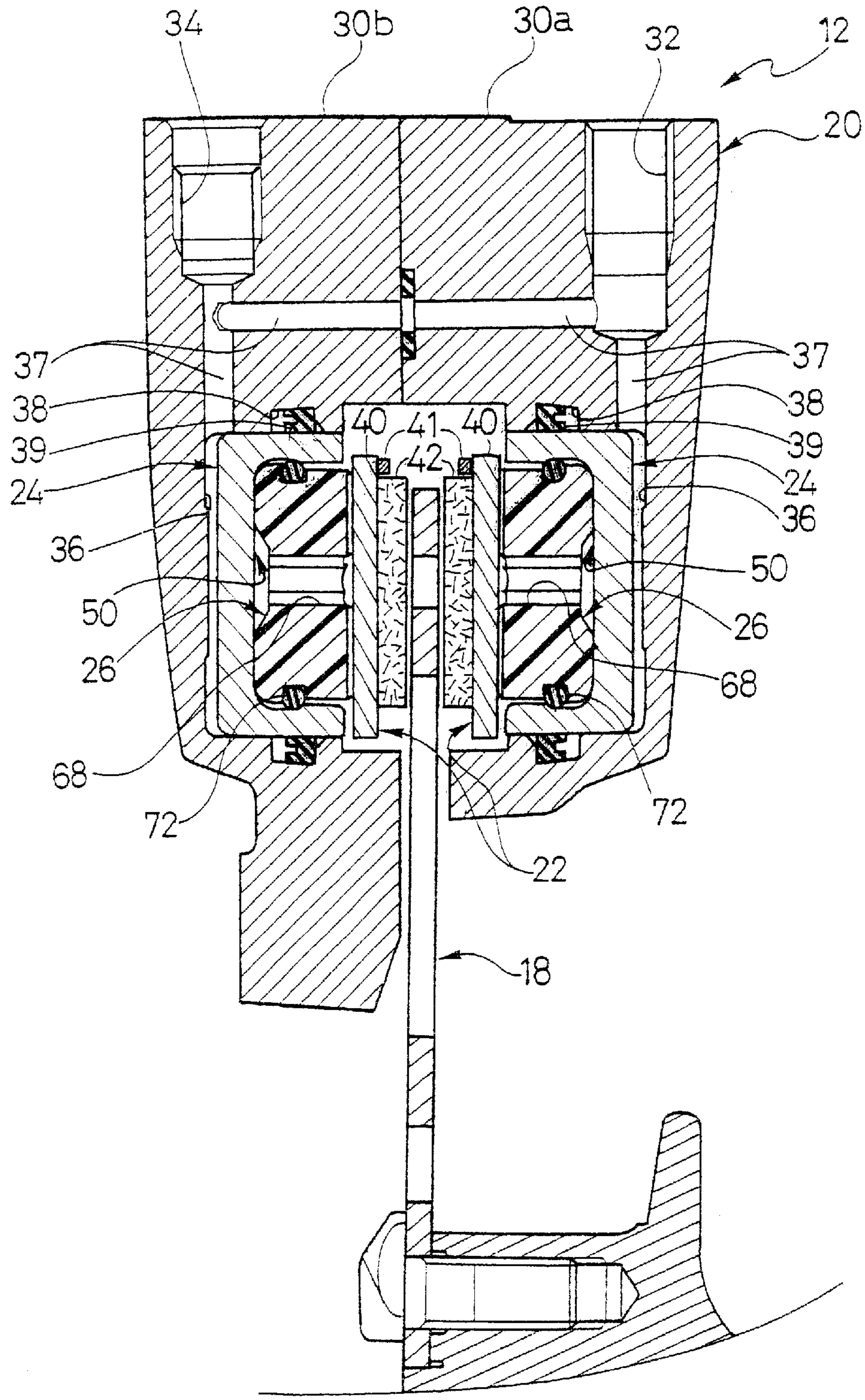
FIG. 7 is an enlarged, partial cross-sectional view of the front disc brake assembly illustrated in FIGS. 2, 4 and 7 as seen along section line 7—7 of FIG. 4.

Referring initially to FIGS. 1–7, a bicycle 10 with a front disc brake assembly 12 and a rear disc brake assembly 14 is illustrated in accordance with a preferred embodiment of the present invention. Front and rear disc brake assemblies 12 and 14 are relatively conventional fluid operated disc brakes fixedly coupled to a frame 13. Therefore, disc brake assemblies 12 and 14 will not be discussed or illustrated in detail herein except as modified by the preferred embodiments of the present invention, as discussed below.

Specifically, front disc brake assembly 12 is fixedly coupled to a front fork 15 of frame 13, and rear disc brake assembly 14 is fixedly coupled to rear fork 17 of frame 13. Frame 13 includes a handle bar 19 mounted to front fork 15 to steer the bicycle 10. Bicycle 10 includes a pair of wheels 16 rotatably coupled to the bicycle frame 13. One wheel 16 is coupled to front fork 15, and one wheel 16 is coupled to rear fork 17. Each wheel 16 has a disc brake rotor 18 fixedly coupled thereto in a conventional manner.

The bicycle 10 and various components thereof are relatively conventional. Therefore, bicycle 10 and its various components will not be discussed or illustrated in detail herein, except as these components relate to front and rear disc brake assemblies 12 and 14 in accordance with the preferred embodiments of the present invention. Moreover, front and rear disc brake assemblies 12 and 14 are substantially identical. Therefore, only front disc brake assembly 12 will be discussed or illustrated in detail herein. However, it will be apparent to one skilled in the art from this disclosure that the descriptions of front disc brake assembly 12 also apply to rear disc brake assembly 14.

Front disc brake assembly 12 basically includes a caliper housing 20, a pair of friction members 22, a plurality of pistons 24, a plurality of heat insulators 26 and a brake operating mechanism **28*a*. Caliper housing 20 is fixedly coupled to front forks 15 in a conventional manner using threaded fasteners. First and second friction members 22 are coupled to caliper housing 20 to form a rotor receiving slot therebetween. At least one of the friction members 22 is movable relative to caliper housing 20, and preferably both friction members 22 are movable relative to caliper housing 20. At least one piston is movably coupled to caliper housing 20. Preferably, each piston 24 is movably coupled to caliper housing 20. Each heat insulator 26 is preferably disposed between a piston 24 and one of the friction members 22 to dissipate heat transferred to pistons 24 from friction members 22**.

Caliper housing 20 is preferably formed of rigid metallic material such as cast aluminum. Caliper housing 20 is formed from a first caliper housing portion **30*a* and a second caliper housing portion 30*b*. First and second caliper housing portions 30*a* and 30*b* are fixedly coupled together by a plurality of bolts. First caliper housing portion 30*a* has a first threaded hole 32 for receiving a fluid coupling unit 33. Second caliper housing portion 30*b* includes a second threaded hole 34 for receiving a bleed valve 35. Caliper housing 20 preferably includes four ports or piston receiving openings 36 (only two shown). More specifically, each of the first and second caliper housing portions 30*a* and 30*b* preferably has a pair of piston receiving openings 36 formed therein for receiving a pair of pistons 24. Each pair of piston receiving openings 36 formed in one of caliper housing portions 30*a* or 30*b* is arranged to oppose the pair of piston receiving openings 36 formed in the other one of caliper housing portions 30*a* or 30*b*. Each pair of pistons 24 (i.e. mounted in one of the caliper housing portions 30*a* or 30*b*) is arranged to move one of the friction members 22 toward disc brake rotor 18**.

Piston receiving openings 36 are in fluid communication with fluid coupling unit 33 and bleed valve 35 via a network of fluid conduits 37. Thus, when actuating fluid is supplied to caliper housing 20 through fluid coupling unit 33, the actuating fluid flows through the network of conduits 37 into the piston receiving openings 36. Each piston receiving opening 36 is preferably an annular opening sized and configured to receive one of the pistons 24 therein. Moreover, each piston receiving opening 36 has a circumferential groove 38 for receiving a return sealing ring or spring back seal 39.

Spring back seal 39 is an annular member formed of a resilient material such as rubber or flexible plastic. Each spring back seal 39 acts to circumferentially seal the internal area of one of the piston receiving openings 36 from the outside of caliper housing 20 when pistons 24 are arranged in piston receiving openings 36. Therefore, when actuating fluid is supplied to piston receiving openings 36, pistons 24 are moved toward rotor 18. Accordingly, friction members 22 are also moved toward disc brake rotor 18 to produce a stopping action on rotor 18, and therefore, wheel 16.

Preferably, caliper housing 20 has two friction members 22 movably coupled thereto, as discussed above. Moreover, friction members 22 are preferably movably coupled to caliper housing 20 such that a rotor receiving slot is formed therebetween. Each friction member 22 basically includes a plate 40 with a friction material 42 fixedly coupled thereto in a conventional manner. Each plate is preferably formed of a rigid metallic material in a conventional manner. Each plate 40 includes a mounting hole 44 for slidably receiving a mounting pin 46 therethrough. Mounting pin 46 is partially threaded at one end and receives a securing member 47 on the opposite end to secure friction members 22 to caliper housing 20 in a conventional manner.

A spring plate or pad spring 41 is arranged between friction members 22 to bias friction members 22 away from each other. The pad spring 41 contacts plates 40. Therefore, when actuating fluid is drained from piston receiving openings 36, the pad spring 41 acts to return friction members 22 to a release position from a braking position and spring back seal 39 acts to return pistons 24 to a release position from a braking position. Accordingly, reliable movement of pistons 24 and friction members 22 can be achieved.

Figure 8:
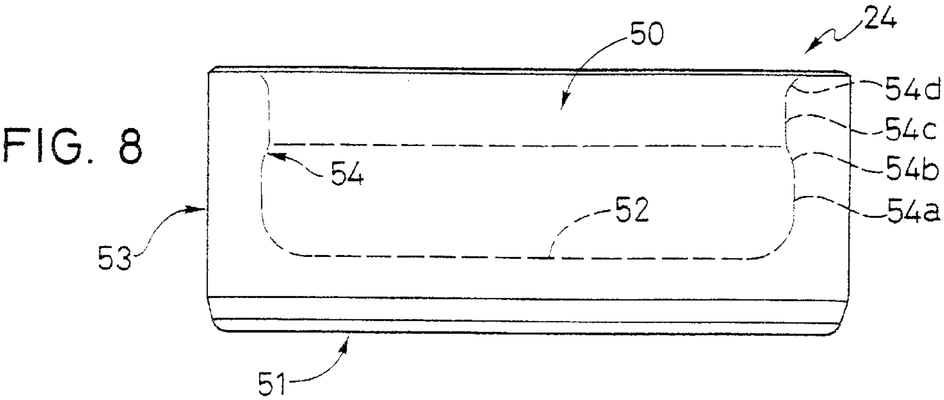
FIG. 8 is an enlarged side elevational view of one of the pistons of the disc brake assembly illustrated in FIGS. 2, 4, 6 and 7.
Figure 9:
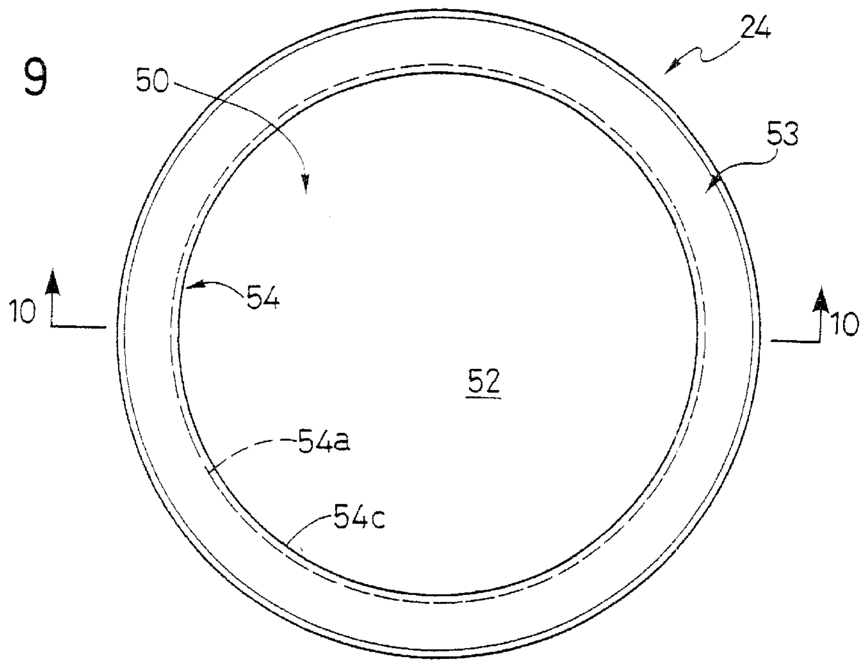
FIG. 9 is a top plan view of the piston illustrated in FIG. 8.
Figure 10:
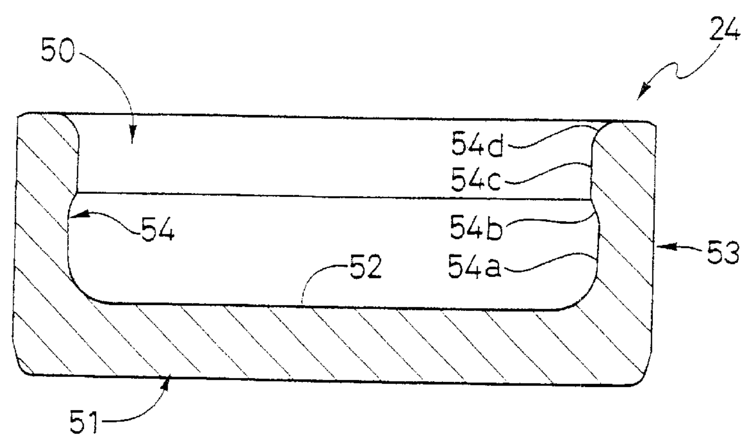
FIG. 10 is a cross-sectional view of the piston illustrated in FIGS. 8–9 as seen along section line 10—10 in FIG. 9.
Figure 11:
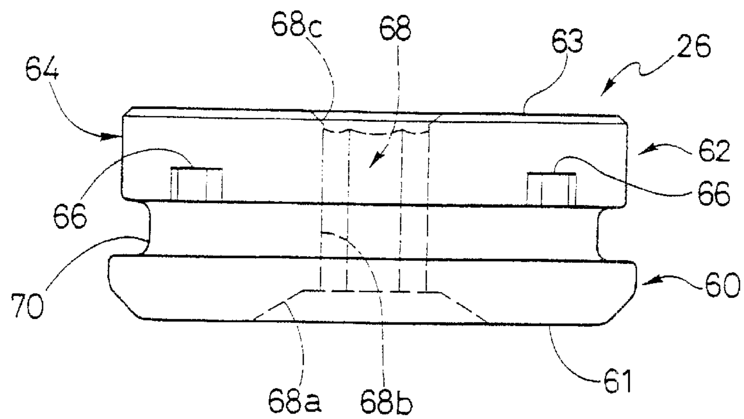
FIG. 11 is an enlarged side elevational view of one of the heat insulators of the disc brake assembly illustrated in FIGS. 2, 4, 6 and 7.

Referring now to FIGS. 8–10, each piston 24 is preferably an annular member formed of rigid metallic material, such as cast aluminum. Each piston 24 is movably coupled to caliper housing 20 to move one of the friction members 22 under pressure from the actuating fluid between a release position and a braking position. Spring back seals 39 frictionally retain pistons 24 in piston receiving openings 36. Movement of the pistons 24 from the release position to the braking position is caused by supplying actuating fluid to the piston receiving openings 36, as discussed above. Pistons 24 are returned to the release position from the braking position by spring back seals 39 when actuating fluid is drained from receiving openings 36. Each piston 24 preferably includes an internal recess 50 facing towards one of the respective friction members 22.

More specifically, each piston 24 basically includes an end wall portion 51 and an annular side wall portion 53 extending from end wall portion 51 to form recess 50. Each side wall portion 53 has an annular interior surface 54 extending from an interior end wall surface 52 of end wall portion 51 to an open end of recess 50. Accordingly, each internal recess 50 is basically formed by one interior end wall surface 52 and one annular interior surface 54.

Preferably, each internal recess 50 is an annular recess with a varying diameter. More specifically, each interior surface 54 preferably includes an annular wider section **54*a*, an annular first tapered section 54*b*, an annular narrower section 54*c* and an annular second tapered section 54*d*. An annular curved section connects each wider section 54*a* to each end wall surface 52. Wider section 54*a* is adjacent interior end wall surface 52 and is considered an annular first section. First tapered section 54*b* extends between wider section 54*a* and narrower section 54*c*. Narrower section 54*c* is adjacent the open end of internal recess 50 and is considered an annular second section. Second tapered section 54*d* extends from narrower section 54*c* to the free edge of interior surface 54. In other words, each wider section 54*a* has a larger diameter than respective narrower sections 54*c*. Moreover, each internal recess 50 is preferably sized and configured to receive one of the heat insulators 26** therein.

Referring now to FIGS. 11–15, each heat insulator 26 is preferably a rigid annular member formed of plastic material with a low heat transfer coefficient. Specifically, each heat insulator 26 is preferably formed of phenol plastic material. Heat insulators 26 are preferably formed by injection molding or another suitable manufacturing technique. As discussed above, each heat insulator 26 is disposed between one of the pistons 24 and one of the friction members 22 to dissipate the heat transferred from friction member 22 to piston 24, and therefore, minimizes the heat transferred to the actuating fluid.

Each heat insulator 26 has a first end 60 with a first end surface 61, a second end 62 with a second end surface 63 and a side wall 64 extending between first end surface 61 and the second end surface 63. Each heat insulator 26 preferably includes a plurality of protrusions 66 extending from side wall 64 and a through bore 68 extending from first end surface 61 to second end surface 63.

Figure 15:
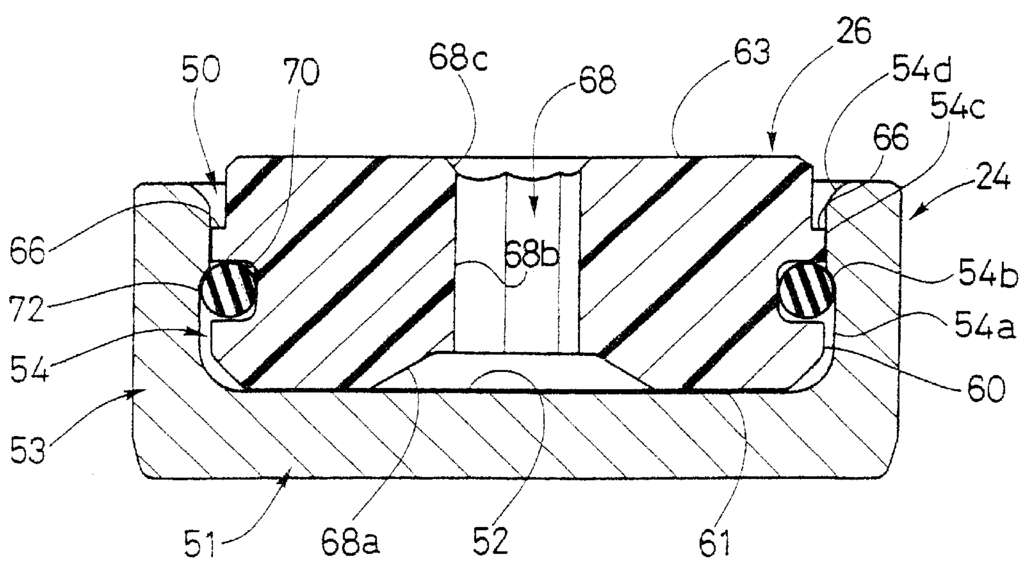
FIG. 15 is a cross-sectional view of the piston illustrated in FIGS. 8–10 and the heat insulator illustrated in FIGS. 11–14 showing the heat insulator installed in a recess in the piston with a retaining ring.
Figure 16:
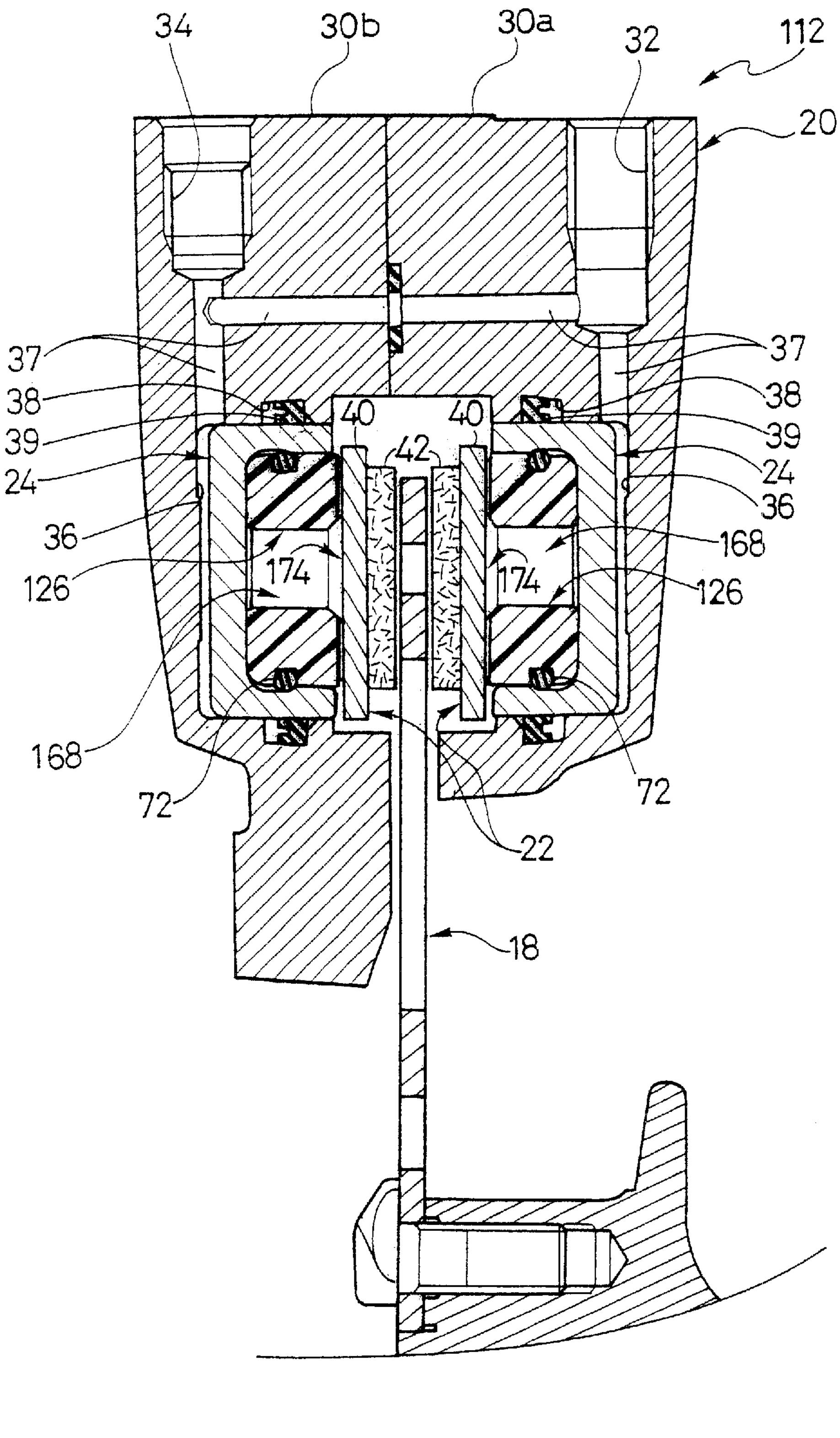
FIG. 16 is an enlarged, partial cross-sectional view of a disc brake assembly illustrated in accordance with a second embodiment of the present invention.
Figure 17:
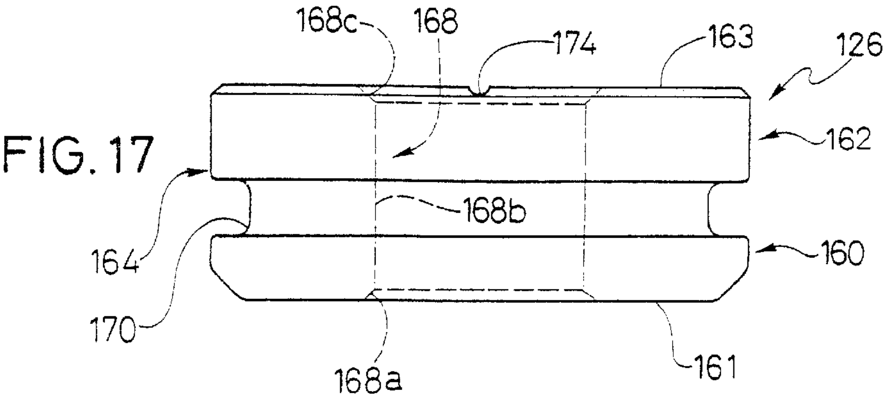
FIG. 17 is an enlarged side elevational view of a heat insulator of the disc brake assembly illustrated in FIG. 16.
Figure 18:
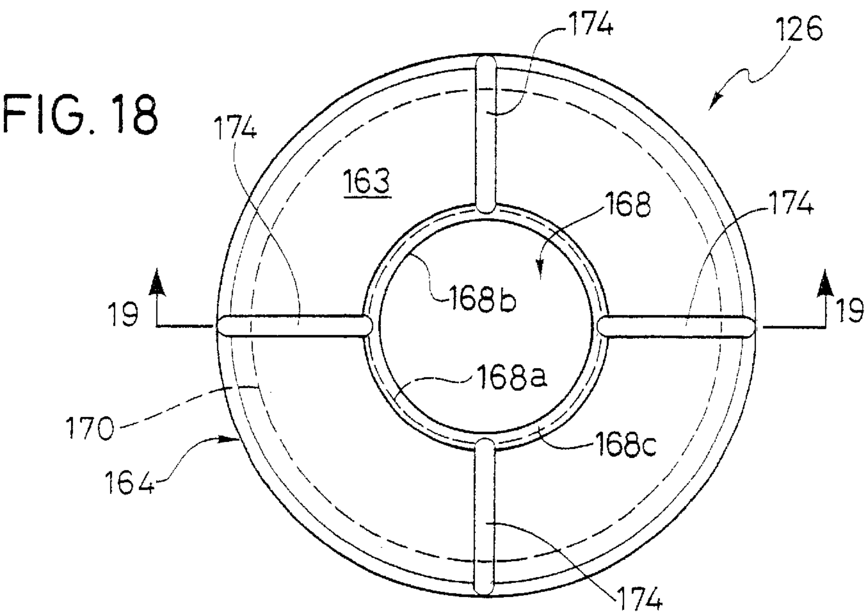
FIG. 18 is a top plan view of the heat insulator illustrated in FIG. 17.
Figure 19:
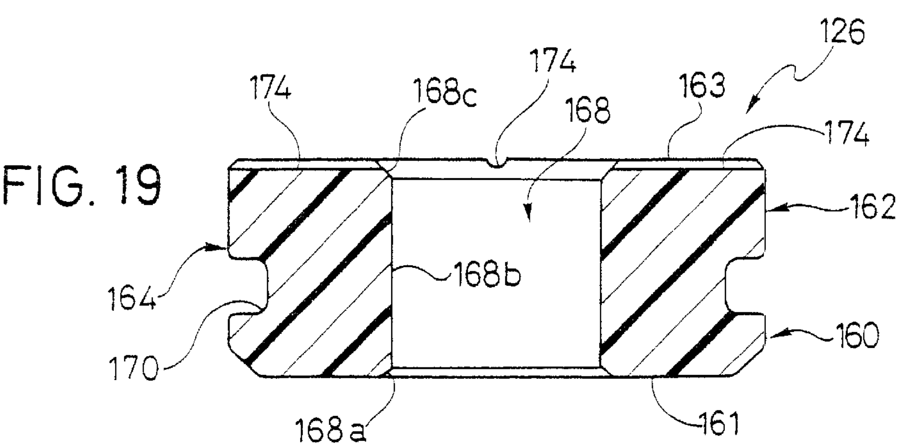
FIG. 19 is a cross-sectional view of the heat insulator illustrated in FIGS. 17 and 18 as seen along section line 19—19 in FIG. 18.

Each first end 60 of each heat insulator 26 is sized and configured to be received in one of the internal recesses 50 of one of the pistons 24. Preferably, each of the second ends 62 of each heat insulator 26 is partially received in one of the internal recesses 50 of one of the pistons 24. Accordingly, each heat insulator 26 preferably extends beyond piston 24 as best seen in FIG. 15. Therefore, heat insulators 26 are arranged to contact friction members 22 and maintain space between pistons 24 and friction members 22. Each side wall 64 includes a retaining slot 70 separating the first end 60 from the second end 62.

Preferably, each first end 60 of each heat insulator 26 has a first diameter and second end 62 has a second diameter smaller than the first diameter. The first diameter of first end 60 is substantially equal to the diameter of narrower section **54*c* of interior surface 54. A retaining ring 72 is arranged in retaining slot 70 to maintain heat insulator 26 within internal recess 50 of piston 24. More specifically, the heat insulators 26 are configured such that retaining ring 72 contacts the first tapered surface 54*b* of interior surface 54 of recess 50. In other words, retaining rings 72 extend radially beyond the diameter of first ends 60 of heat insulators 26 when installed in retaining slots 70**.

Figure 12:
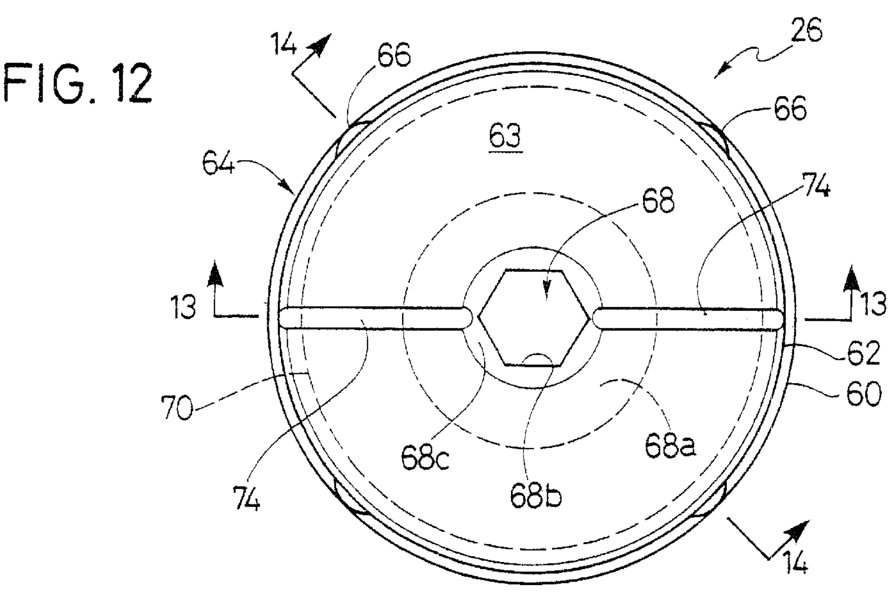
FIG. 12 is a top plan view of the heat insulator illustrated in FIG. 11.
Figure 13:
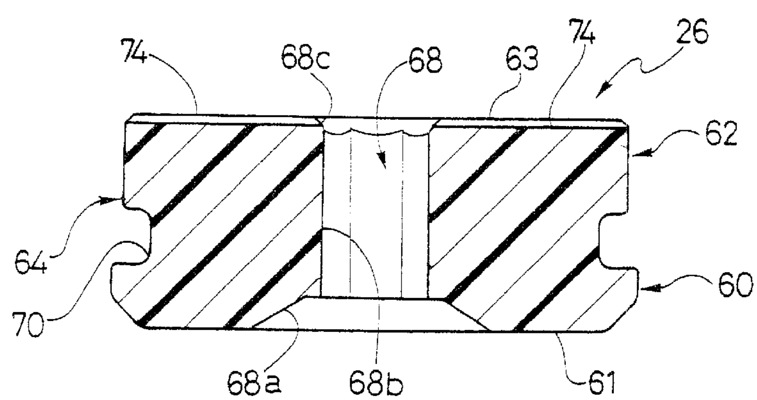
FIG. 13 is a cross-sectional view of the heat insulator illustrated in FIGS. 11 and 12 as seen along section line 13—13 in FIG. 12.
Figure 14:
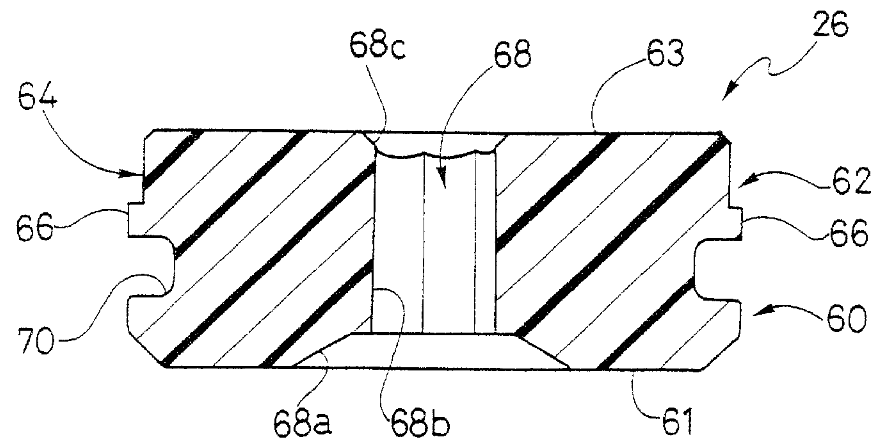
FIG. 14 is a cross-sectional view of the heat insulator illustrated in FIGS. 11 and 12 as seen along section line 14—14 in FIG. 12.

Side wall 64 preferably has four protrusions 66 extending therefrom. Protrusions 66 are preferably circumferentially and equally spaced from each other. Moreover, the plurality of protrusions 66 are preferably arranged on the second end 62 of heat insulator 26 to provide an air space between heat insulator 26 and the internal recess 50 of piston 24. The plurality of protrusions 66 are arranged on the second end 62 and extend radially outward to a third diameter equal to the first diameter of first end 60 as best seen in FIGS. 12 and 14. The plurality of protrusions 66 preferably have an axial length smaller than an axial length of second end 62 of heat insulator 26. Moreover, when heat insulators 26 are positioned within recesses 50 of pistons 24, protrusions 66 contact narrower section 54*c* of interior surface 54 of recess 50. Thus, heat insulators 26 are securely positioned within the recesses 50.

Through bore 68 extends from first end surface 61 to second end surface 63 and is preferably a central through bore. Through bore 68 includes a first tapered section 68*a*, a central hexagonal section 68*b* and a second tapered section 68*c*. First tapered section 68*a* is a relatively large conical surface adjacent first end surface 61 and extends to hexagonal section 68*b*. Hexagonal section 68*b* extends from tapered section 68*a* to second tapered section 68*c*. Second tapered section 68*c* is adjacent second end surface 63. Preferably, through bore 68 has a diameter of at least 25% of the diameter of second end 62, with first tapered section 68*a* having a maximum diameter of about 50% of the diameter of first end 60. Such diameters reduce the contact area of heat insulators 26 with both the piston (i.e. first end surface 61) and friction members 22 (i.e. second end surface 63).

Second end surface 63 preferably has a pair of circumferentially spaced grooves 74 formed therein. Each groove 74 extends radially outward from through 55 bore 68 to side wall 64 to provide fluid communication with external air. Preferably, grooves 74 are circumferentially and equally spaced from each other, and each groove 74 is located midway between an adjacent pair of protrusions 66 as best seen in FIG. 12. Accordingly, through bore 68 is in fluid communication with external air via grooves 74. Moreover, side wall 64 is in fluid communication with external air due to the presence of protrusions 66. Accordingly, heat insulator 26 is provided with both an internal air space and an external air space.

As discussed above, pistons 24 are preferably constructed of aluminum. Aluminum has a heat transfer coefficient of about 164. The heat insulators 26 are preferably constructed of phenol plastic, as discussed above. Phenol plastic has a heat transfer coefficient of about 0.13–0.25. However, air has an even lower heat transfer coefficient of about 0.02. Accordingly, it is preferable to provide air spaces between pistons 24 and heat insulators 26 and between heat insulators 26 and friction members 22 to reduce the heat transferred from friction members 22 to pistons 24. Therefore the heat transferred to the actuating or hydraulic fluid can also be reduced.

Referring again to FIGS. 1–3, brake operating mechanisms 28*a* and 28*b* are conventional disc brake operating mechanisms. Therefore, brake operating mechanisms 28*a* and 28*b* will not be discussed or illustrated in detail herein. Brake operating mechanisms 28*a* and 28*b* are provided to control disc brake assemblies 12 and 14. Brake operating mechanisms 28*a* and 28*b* are preferably fixedly mounted on handle bar 19 adjacent the hand portions of handle bar 19. Accordingly, brake operating mechanisms 28*a* and 28*b* are operated in a conventional manner such that disc brake assemblies 12 and 14 move friction members 22 from a release position in which bicycle wheels 16 and the disc brake rotors 18 are free to rotate, and a braking position. In the braking position, disc brake assemblies 12 and 14 apply a braking force against disc brake rotor 18 to stop rotation of bicycle wheels 16 and disc brake rotors 18.

Brake operating mechanisms 28*a* and 28*b* will now be described in more detail. Basically, brake operating mechanisms 28*a* and 28*b* are designed to actuate the disc brake assemblies 12 and 14 in a conventional manner to apply a forcible gripping action on disc brake rotor 18 to stop rotation of one of the front wheels 16. Brake operating mechanism 28*b* actuates rear disc brake assembly 14 and brake operating mechanism 28*a* actuates front disc brake assembly 12. Brake operating mechanism 28*b* is identical to brake operating mechanism 28*a* except brake operating mechanism 28*b* is a mirror image of brake operating mechanism 28*a*. Each of the brake operating mechanisms 28*a* and 28*b* basically includes a brake lever 80, a hydraulic or master cylinder 81, a hydraulic or master piston 82, and an actuation fluid reservoir 83. Preferably, each of the brake operating mechanisms 28*a* and 28*b* is a single unit, which is mounted on handlebar 19.

In particular, referring to either one of the brake operating mechanisms 28*a* and 28*b*, brake lever 80 includes a mounting portion 84 and a lever portion 85. Mounting portion 84 is designed to be clamped onto handle bar 19 in a conventional manner. Mounting portion 84 is integrally formed with master cylinder 81 such that master cylinder 81, master piston 82 and actuation fluid reservoir 83 are all supported on mounting portion 84 of brake lever 80. Lever portion 85 is pivotally coupled to mounting portion 84 for movement between a release position and a braking position. Normally, lever portion 84 is maintained in a release position in a conventional manner.

Master piston 82 is movably mounted within master cylinder 81 in a conventional manner. More specifically, actuation fluid reservoir 83 is mounted on master cylinder 81 and is in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line 86 which is coupled to one of the disc brake assemblies 12 and 14 via fluid coupling units 33. Thus, the pressurized actuating fluid causes the pistons 24 and friction members 22 to move so as to engage disc brake rotors 18 to stop rotation of wheels 16.

SECOND EMBODIMENT

Referring now to FIGS. 16–20, a modified disc brake assembly 112 with a plurality of heat insulators 126 is illustrated in accordance with a second embodiment of the present invention. This second embodiment of the present invention is identical to the first embodiment, except that heat insulators 26 of the first embodiment have been modified in this second embodiment. Specifically, heat insulators 26 have been replaced with modified heat insulators 126 in this second embodiment of the present invention. The other parts of disc brake assembly 112 are identical to the parts of the first embodiment (i.e., disc brake assembly 12). Accordingly, these parts will not be discussed or illustrated in detail herein. Moreover, identical parts will be identified with the same reference numerals in this second embodiment as in the first embodiment.

Each heat insulator 126 is preferably a rigid annular member formed of plastic material with a low heat transfer coefficient. Specifically, each heat insulator 126 is preferably formed of phenol plastic material. Heat insulators 126 are preferably formed by injection molding or another suitable manufacturing technique. Each heat insulator 126 is disposed between one of the pistons 24 and one of the friction members 22 to dissipate the heat transferred from friction member 22 to piston 24, and therefore the heat transferred to the actuating fluid. Each heat insulator 126 has a first end 160 with a first end surface 161, a second end 162 with a second end surface 163 and a side wall 164 extending between the first end surface 161 and the second end surface 163. Side wall 164 does not include the plurality of protrusions 66 from the first embodiment. Heat insulator 126 includes a through bore 168 extending from first end surface 161 to second end surface 163.

Figure 20:
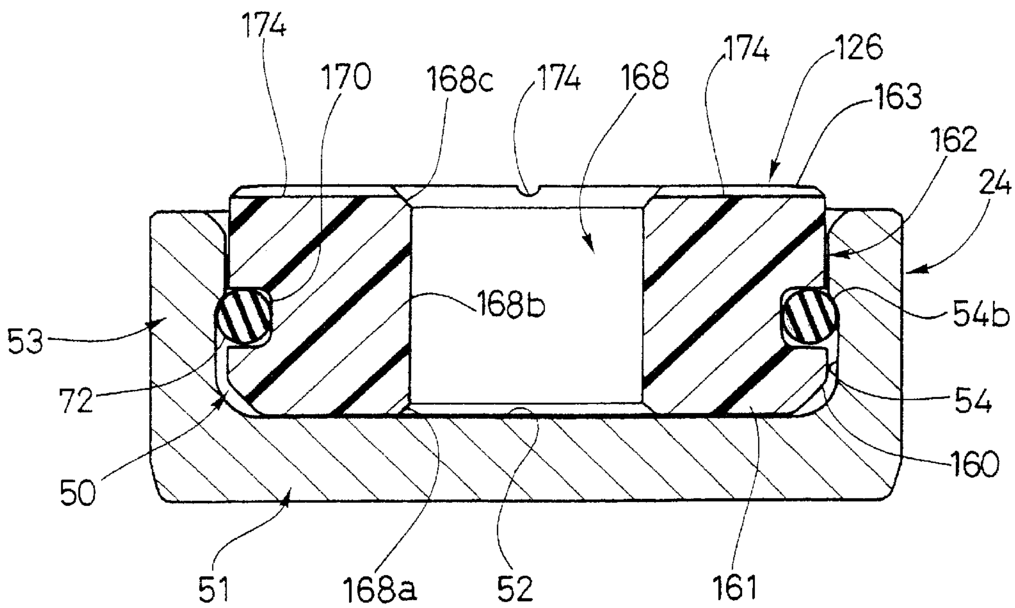
FIG. 20 is a cross-sectional view of the piston illustrated in FIGS. 8–10 and the heat insulator illustrated in FIGS. 17–19 showing the heat insulator installed in a recess of the piston with a retaining ring.

Each first end 160 of heat insulators 126 is sized and configured to be received in one of the internal recesses 50 of piston 24. Preferably, the second end 162 of heat insulator 126 is partially received in the internal recess 50 of piston 24. Accordingly, heat insulator 126 preferably extends beyond piston 24 as best seen in FIG. 20. Each side wall 164 includes a retaining slot 170 separating the first end 160 from the second end 162.

Preferably, first end 160 of heat insulator 126 has a first diameter and second end 162 has a second diameter equal to the first diameter. Each first end 160 has a diameter substantially equal to the diameter of narrower section 54*c* of interior surface 54 of each piston. A retaining ring 72 is arranged in retaining slot 170 to maintain heat insulator 126 within internal recess 50 of piston 24. More specifically, the heat insulators 126 are configured such that retaining ring 72 contacts the first tapered surface 54*b* of interior surface 54 of recess 50. In other words, retaining rings 72 extend radially beyond the diameter of first ends 160 of heat insulators 126 when installed in retaining slots 170.

Through bore 168 extends from first end surface 161 to second end surface 163 and is preferably a central through bore. Through bore 168 includes a first tapered section 168*a*, a central section 168*b* and a second tapered section 168*c*. Through bore 168 preferably has a diameter larger than about 25 percent of a maximum diameter of heat insulator 126. More specifically, through bore 168 preferably has a diameter about 40 percent of the maximum diameter of heat insulator 126. Such a diameter reduces the contact area of heat insulators 126 with both the piston 24 (i.e. first end surface 161) and friction members 22 (i.e. second end surface 163).

Second end surface 163 of heat insulator 126 preferably includes a plurality of grooves 174 formed therein. Preferably, each groove 174 extends radially outward from through bore 168 to side wall 164. More specifically, the plurality of grooves 174 are preferably circumferentially and equally spaced apart from each other to provide fluid communication with external air. Preferably, second end surface 163 includes four grooves 174 arranged at 90° angles relative to each other.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A piston assembly for a disc brake assembly comprising:

a piston comprising
- an end wall portion, and
- an annular side wall portion extending from said end wall portion to form a recess with an open end,
- said side wall portion having an annular interior surface with an annular first section adjacent said end wall portion and an annular second section adjacent said open end, said first section having a first diameter and said second section having a second diameter smaller than said first diameter; and a heat insulator having a first end received in said recess of said piston and a second end partially received in said recess of said piston, said first end of said heat insulator having a third diameter and said second end having a fourth diameter smaller than said third diameter.

2. The piston assembly according to claim 1, wherein said annular interior surface includes a tapered section extending between said first section and said second section.

3. The piston assembly according to claim 1, wherein said heat insulator has a plurality of protrusions arranged on said second end that extend radially outward.

4. The piston assembly according to claim 3, wherein said third diameter is substantially equal to said second diameter.

5. The piston assembly according to claim 1, wherein said first end of said heat insulator has a third diameter and said second end has a fourth diameter equal to said third diameter.

6. The piston assembly according to claim 5, wherein said third diameter is substantially equal to said second diameter.

7. The piston assembly according to claim 1, wherein said heat insulator includes a through bore extending from a first end surface of said first end to a second end surface of said second end.

8. A piston assembly for a disc brake assembly comprising:

a piston comprising
- an end wall portion, and
- an annular side wall portion extending from said end wall portion to form a recess with an open end,
- said side wall portion having an annular interior surface with an annular first section adjacent said end wall portion and an annular second section adjacent said open end, said first section having a first diameter and said second section having a second diameter smaller than said first diameter; and
- a heat insulator having a first end received in said recess of said piston and a second end partially received in said recess of said piston, said heat insulator including a through bore extending from a first end surface of said first end to a second end surface of said second end, said second end surface of said heat insulator having a plurality of grooves formed therein, said grooves extending radially outward from said through bore.

9. The piston assembly according to claim 8, wherein said heat insulator has a plurality of protrusions arranged on said second end that extend radially outward.

10. The piston assembly according to claim 8, wherein said first end of said heat insulator having a third diameter and said second end having a fourth diameter smaller than said third diameter.

11. A disc brake assembly comprising:

a caliper housing;

a first and a second friction member coupled to said caliper housing to form a rotor receiving slot between said first and second friction members with at least said first friction member being movably coupled to said caliper housing;

a piston movably coupled to said caliper housing to move said first friction member between a release position and a braking position, said piston having an end wall portion, and an annular side wall portion extending from said end wall portion to form a recess with an open end, said side wall portion having an annular interior surface with an annular first section adjacent said end wall portion and an annular second section adjacent said open end, said first section having a first diameter and said second section having a second diameter smaller than said first diameter; and a heat insulator disposed between said piston and said first friction member, said heat insulator having a first end with a first end surface received in said recess of said piston, said first end of said heat insulator being completely received in said recess and said heat insulator having a second end partially received in said recess, said first end of said heat insulator having a third diameter and said second end having a fourth diameter smaller than said third diameter.

12. The disc brake assembly according to claim 11, wherein said annular interior surface includes a tapered section extending between said first section and said second section.

13. The disc brake assembly according to claim 11, wherein said heat insulator has a plurality of protrusions arranged on said second end that extend radially outward.

14. The disc brake assembly according to claim 13, wherein said third diameter is substantially equal to said second diameter.

15. The disc brake assembly according to claim 11, wherein said first end of said heat insulator has a third diameter and said second end has a fourth diameter equal to said third diameter.

16. The disc brake assembly according to claim 15, wherein said third diameter is substantially equal to said second diameter.

17. The disc brake assembly according to claim 11, wherein said heat insulator includes a through bore extending from said first end surface of said first end to a second end surface of said second end.

18. A disc brake assembly comprising:

a caliper housing;

a first and a second friction member coupled with said caliper housing to form a rotor receiving slot between said first and second fiction members with at least said first friction member being movably coupled to said caliper housing;

a piston movably coupled to said caliper housing to move said first friction member between a release position and a braking position, said piston having an end wall portion, and an annular side wall portion extending from said end wall portion to form a recess with an open end, said side wall portion having an annular interior surface with an annular first section adjacent said end wall portion and an annular second section adjacent said open end, said first section having a first diameter and said second section having a second diameter smaller than said first diameter, and a heat insulator disposed between said piston and said first friction member, said heat insulator having a first end with a first end surface received in said recess of said piston, said first end of said heat insulator being completely received in said recess and said heat insulator has a second end partially received i said recess, said heat insulator including a through bore extending from said first end surface of said first end to a second end surface of said second end, said second end surface of said heat insulator having a plurality of grooves formed therein, said grooves extending radially outward from said trough bore.

19. The disc brake assembly according to claim 18, wherein said heat insulator has a plurality of protrusions arranged on said second end that extend radially outward.

20. The disc brake assembly according to claim 18, wherein said first end of said heat insulator having a third diameter and said second end having a fourth diameter smaller than said third diameter.

* * * * *